Patented Aug. 18, 1942

2,293,445

UNITED STATES PATENT OFFICE 2,293,445

LUBRICANT WITH HIGH TEMPERATURE STABILITY

Joseph F. Nelson, Elizabeth, N. J., assignor to Standard Oil Development Company, a corporation of Delaware No Drawing. Application November 19, 1938, Serial No. 241,333

1 Claim. (Cl. 252—52)

The present invention relates to the art of lubrication and more specifically to lubricants with high temperature stability such as to make them desirable for use in automotive engine lubrication and otherwise where high temperature stability is required. The invention will be understood from the following description:

Mineral lubricating oils have been widely used as lubricants for many years, but within the last few years the severity of the conditions under which they are used has so greatly increased that in many cases unblended oils have proved to be lacking in certain properties and recourse has been had to improvement by the addition of blending agents to increase one or more desirable properties. The great majority of types of blending agents, however, have not been wholly satisfactory because while they may improve one particular property of the oil, they may equally well decrease its effectiveness in some other respect. Such agents as have been used are generally employed in specific types of equipment and there are no generally universal agents, which are good for all or even a majority of the conditions likely to be met.

Agents have now been found, however, which come closer to the ideal than any yet proposed in that they make an improvement in almost all of the desired properties of an oil for the lubrication of automotive engines. Thus in an engine oil, the lubricant is preferably highly refined and this in itself ordinarily makes it more sensitive to oxidation and decomposition. To be satisfactory the oil should have a low oxidation rate. It should be capable of carrying higher loads than the unblended oils, and give a clean engine especially in respect to piston rings, ring grooves and the like. It must also minimize or reduce deposition of carbon and the varnish like deposits which are frequently found in engines.

The agents which have been found most satisfactory according to the present invention fall within the class of aromatic phosphite or thio phosphite esters which contain substituent hydroxyl, or mercapto groups or modified hydroxyl or mercapto groups, i. e., esterified or etherified. Among the various compounds, those containing a hydroxyl group directly attached to the aromatic are preferred. The aromatic may be of the single ring type as found in phenol, cresol or diphenyl, or may be of the condensed ring type such as found in naphthols or anthrols. It is usually the case that the alkylated phenolic or thio phenolic compounds are preferable to the unalkylated products of all types.

Of the numerous compounds, the phosphite esters of polyhydroxy phenolic compounds, in which at least one of the hydroxyl groups is unesterified, are found to be very excellent, for example ortho, meta or para-hydroxy phenyl phosphite, or the alkylated derivatives corresponding to the cresol compounds, or those with higher alkyl groups such as ethyl, the various propyl, butyl, amyl or higher alkyl groups. These alkylated hydroxy phosphites are preferable to the unalkylated products.

As stated before, the hydroxyl or mercapto radicals are on the aromatic radical, but these groups may be modified by chemical reaction. The most general chemical formula might be expressed as follows:

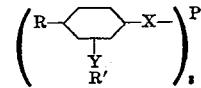

where R' is a hydrocarbon radical either alkyl or aryl, X is an O or S atom, Y is an O or S atom, and R is a hydrogen atom or a residue of an acid or alcohol. More specific formulae, such as the following will be more helpful:

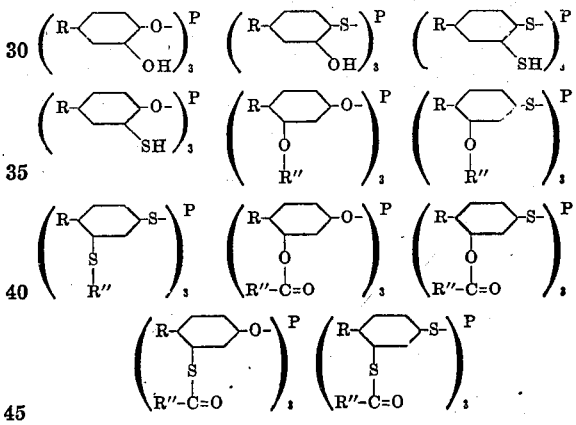

where R and R'' are hydrocarbon radicals, either alkyl or aryl.

It will be understood that benzene rings are used to illustrate the type formula, but other aryl nuclei can be used in its stead.

In the case of the esters, the organic acid used may be of short chain or it may be a larger molecule such as found in the common higher or fatty acids, stearic, oleic or those produced by oxidation of paraffin wax at low temperatures, but acetic acids may also be used. In the same manner the alkyl groups either attached directly to the aromatic ring or on the ether may be short chain, for example, ethyl, methyl, propyl, or butyl, or they may be higher molecular weight radicals such as cetyl, lauryl, oleyl, octa decyl, and the like, but phenolic radicals may likewise be used.

The materials described above are added to mineral lubricating oils in proportion of from .1 to about 1 or 2% by weight. They may also be employed as the sole addition agents because they have excellent properties not only of oiliness but also for reducing oxidation, preventing ring sticking, reducing carbon deposition and the like, and they may be used in conjunction with other materials to further enhance these properties, for example additional oxidation inhibitors of other types, sludge dispersers, pour inhibitors, and the like. They may be used also in connection with metallic soaps, particularly those of aluminum, calcium, nickel, chromium, and the like, for the particular purpose for which these materials are ordinarily used. The lubricating oil may be of any desired type useful for the particular purpose at hand, derived either from the paraffinic, asphaltic or naphthenic crudes, and the viscosity is chosen for the particular purpose.

The following examples of the present compounds may be considered illustrative of the invention:

EXAMPLE I

To a hydrocarbon lubricating oil S. A. E. 20 was added ¼% of a tritertiary butyl ortho hydroxy phenyl phosphite. The oxidation rates of the oil and the oil to which this compound was added were then determined by passing a major volume of oxygen in a closed system so as to bubble through a 10 cc. sample which was held at 200° C. At 15 minute intervals the volume of the gas was measured and absorption was estimated by difference. The oxidation rate of the blank sample was found to be 82—60—48 cc. of oxygen per 15 minute intervals, while the sample containing the addition agent showed a rate of 3—4—5—7.

EXAMPLE II

To another sample of a similar oil S. A. E. grade 40, ¼% of tritertiary butyl ortho hydroxy phenyl phosphite was added and engine tests were made in a C. F. R. engine for a period of 14 hours on each of the samples.

The engines were run under carefully controlled and comparable conditions and after each test the pistons were taken down and examined. A rate was assigned to each part depending on its condition and the amount of the carbon and varnish, the number of rings stuck and the degree of sticking were noted. All of this data permits a clear comparison of the engine when using the two different oils and an overall rating is obtained in which weight is given to each of the individual portions of the engine. It will be remembered that in all cases the lower numbers indicate the better engine condition.

The data is given in the following table:

C. F. R. ENGINE PERFORMANCE

*Demerits*

| | Percent reference | Piston overall | Rings stuck | Degree sticking | Ring slits | Ring grooves | Carbon under piston | Varnish skirt | Carbon formed |
|---|---|---|---|---|---|---|---|---|---|
| Blank oil | 100 | 4.10 | 3 | 810 | 2.83 | 6.00 | 4 | 4.5 | 4.67 |
| Ditto+¼% tritert.-butyl-o-hydroxyphenyl phosphite | 22 | 0.97 | 0 | 0 | 0.17 | 2.25 | 1.5 | 0.5 | 1.24 |

The thio-phenolic or thio-phosphite compounds are found to give equally good results.

From the above data it is clearly apparent that the addition agent has greatly improved the operation of the oil in the engine.

The present invention is not to be limited by any theory of the mechanism by which the addition agent effects the improvement nor to any particular addition agent, but only to the following claim in which it is desired to claim all novelty inherent in the invention.

I claim:

A composition comprising a highly refined mineral oil and tritertiary butyl ortho hydroxy phenyl phosphite.

JOSEPH F. NELSON.